US011232620B2

(12) United States Patent
Park et al.

(10) Patent No.: US 11,232,620 B2
(45) Date of Patent: Jan. 25, 2022

(54) METHOD TO CREATE ANIMATION

(71) Applicant: Netmarble Corporation, Seoul (KR)

(72) Inventors: Seungje Park, Seoul (KR); Shounan An, Gyeonggi-do (KR); Insoo Oh, Seoul (KR); Young Bak Jo, Gyeonggi-do (KR); Shin Dong Kang, Seoul (KR); Duke Donghyun Kim, Busan (KR)

(73) Assignee: Netmarble Corporation, Seoul (KR)

( * ) Notice: Subject to any disclaimer, the term of this patent is extended or adjusted under 35 U.S.C. 154(b) by 165 days.

(21) Appl. No.: 16/736,709

(22) Filed: Jan. 7, 2020

(65) Prior Publication Data
US 2021/0027512 A1 Jan. 28, 2021

(30) Foreign Application Priority Data

Jul. 25, 2019 (KR) .......... 10-2019-0090517
Nov. 7, 2019 (KR) .......... 10-2019-0141689

(51) Int. Cl.
*G06T 13/40* (2011.01)
*G06K 9/00* (2006.01)
(Continued)

(52) U.S. Cl.
CPC .......... *G06T 13/40* (2013.01); *G06K 9/00268* (2013.01); *G06K 9/00302* (2013.01); *G06N 3/0454* (2013.01); *G06N 3/08* (2013.01)

(58) Field of Classification Search
CPC .............. G06T 13/40; G06K 9/00268; G06K 9/00302; G06N 3/0454; G06N 3/08
See application file for complete search history.

(56) References Cited

U.S. PATENT DOCUMENTS 10,169,905 B2 * 1/2019 Bhat ................. G06T 7/246
2020/0302667 A1 * 9/2020 del Val Santos ..... G06N 3/0472

FOREIGN PATENT DOCUMENTS

KR 1020190008137 A 1/2019
KR 1020190075416 A 7/2019

OTHER PUBLICATIONS

Asadiabadi, Sasan, Rizwan Sadiq, and Engin Erzin. "Multimodal speech driven facial shape animation using deep neural networks." 2018 Asia-Pacific Signal and Information Processing Association Annual Summit and Conference (APSIPA ASC). IEEE, 2018. (Year: 2018).*

(Continued)

*Primary Examiner* — Xin Sheng
(74) *Attorney, Agent, or Firm* — Umberg Zipser LLP; Ryan Dean

(57) ABSTRACT

Disclosed is a computer program stored in a computer readable storage medium. When the computer program is executed by one or more processors of a computing device, the computer program performs operations for generating a facial animation, and the operations may include: inputting two or more training input data to a facial animation generation model; training the facial animation generation model with a common feature of the two or more training input data by using a first network function included in the facial animation generation model; and training the facial animation generation model with an independent feature of each of the two or more training input data by using a second network function to cause the facial animation generation model to generate the facial animation according to the input data.

11 Claims, 6 Drawing Sheets

(51) Int. Cl.
*G06N 3/04* (2006.01)
*G06N 3/08* (2006.01)

(56) References Cited

OTHER PUBLICATIONS

Dinh Viet Sang et al., "Multi-task learning for smile detection, emotion recognition and gender classification", ResearchGate, pp. 340-347, Dec. 2017.
Tero Karras et al., "Audio-Driven Facial Animation by Joint End-to-End Learning of Pose and Emotion", ACM Transactions on Graphics, vol. 36, No. 4, Article 94, Jul. 2017.
Office Action issued for Korean Patent Application No. 10-2019-0141689 dated Aug. 31, 2020; 4 pgs.

\* cited by examiner

METHOD TO CREATE ANIMATION

CROSS-REFERENCE TO RELATED APPLICATIONS

This application claims priority to and the benefit of Korean Patent Application No. 10-2019-0090517 filed in the Korean Intellectual Property Office on Jul. 25, 2019, and Korean Patent Application No. 10-2019-0141689 filed in the Korean Intellectual Property Office on Nov. 7, 2019 the entire contents of which are incorporated herein by reference.

TECHNICAL FIELD

The present invention relates to a method of generating an animation, and more particularly, to a method of generating an animation based on input data.

BACKGROUND ART

Recently, with the rapid development of animation-related technology, the movement of applying an animation to the whole industry is increasing. An animation is used not only in a cartoon-related industry but also in various industry fields. In the meantime, in order to generate an animation, it takes a lot of time and cost.

In the case of a game industry, a voice actor records a voice based on a game story, an animation for the voice based on that voice is generated, and the generated animation is provided to game players. The volume of game stories recorded by the voice actor is huge, and time and cost required to generate an animation based on the huge volume of game stories are considerable.

Accordingly, there is a need in the art to decrease time and cost for generating an animation based on voice data.

Korean Patent Application Laid-Open No. 10-2019-0008137 discloses an apparatus and a method of synthesizing voices based on deep learning by using multiple speaker data.

SUMMARY OF THE INVENTION

The present disclosure is conceived in response to the background art, and has been made in an effort to provide a method of generating an animation.

According to an exemplary embodiment of the present disclosure for implementing the foregoing object, the present disclosure provides a computer program stored in a computer readable storage medium, in which when the computer program is executed by one or more processors of a computing device, the computer program performs operations for generating a facial animation, and the operations may include: inputting two or more training input data to a facial animation generation model; training the facial animation generation model with a common feature of the two or more training input data by using a first network function included in the facial animation generation model; and training the facial animation generation model with an independent feature of each of the two or more training input data by using a second network function to cause the facial animation generation model to generate the facial animation according to the input data.

In the alternative exemplary embodiment of the operations of the computer program performing the operations for providing the method of generating the animation, the first network function may include a first sub-network function and a second sub-network function formed of one or more dimensionality reduction layers, the first sub-network function may compute two or more input data and output a common voice feature of the two or more input data, and the second sub-network function may compute the common voice feature and output a feature vector about a common facial pose corresponding to the two or more input data.

In the alternative exemplary embodiment of the operations of the computer program performing the operations for providing the method of generating the animation, each of the two or more training input data is matched with the facial feature data, the second network function may be formed of one or more dimensionality expansion layers, and the second network function may include two or more parallel third sub-network functions associated with the facial feature data.

In the alternative exemplary embodiment of the operations of the computer program performing the operations for providing the method of generating the animation, the third sub-network function may perform a computation based on a one-hot vector that is a representation for the facial feature data associated with the third sub-network function and determine locations of two or more vertexes included in the facial animation.

In the alternative exemplary embodiment of the operations of the computer program performing the operations for providing the method of generating the animation, an initial training weight of at least a part of the layers included in the third sub-network function may be determined based on principal component analysis data of the training data included in a training data subset associated with the facial feature data associated with the third sub-network function.

In the alternative exemplary embodiment of the operations of the computer program performing the operations for providing the method of generating the animation, the operations may further include inputting emotional state data matched to the input data to at least a part of the layers of the first network function or the second network function.

In the alternative exemplary embodiment of the operations of the computer program performing the operations for providing the method of generating the animation, the inputting of the emotional state data matched to the input data to at least a part of the layers of the first network function or the second network function may include inputting the emotional state data to the remaining layers, except for the last layer, of the first network function.

In the alternative exemplary embodiment of the operations of the computer program performing the operations for providing the method of generating the animation, the facial animation generation model may be trained by differently setting an update rate of the weights for the first network function and the remaining layers, except for at least a part of the layers, of the second network function and the update rate of the weight for at least a part of the layers of the second network function during a predetermined epoch.

In the alternative exemplary embodiment of the operations of the computer program performing the operations for providing the method of generating the animation, in the case of backpropagation based on an error between an output obtained by performing the computation by using two or more training input data as the input of the facial animation generation model and the two or more training facial animations, the facial animation generation model may be trained by an operation of excluding at least a part of the layers of the second network and updating the weights only for the remaining layers except for at least a part of the layers of the second network function and the first network function during a predetermined epoch.

According to an exemplary embodiment of the present disclosure for implementing the foregoing object, the present disclosure provides a method of providing a facial animation, the method including: inputting two or more training input data to a facial animation generation model; training a common feature of the two or more training input data by using a first network function included in the facial animation generation model; and training the facial animation generation model with an independent feature of each of the two or more training input data by using a second network function to cause the facial animation generation model to generate the facial animation according to the input data.

According to an exemplary embodiment of the present disclosure for implementing the foregoing object, the present disclosure provides a server for providing a method of generating a facial animation, the server including: a processor including one or more cores; and a memory, in which the processor inputs two or more training input data to a facial animation generation model, trains a common feature of the two or more training input data by using a first network function included in the facial animation generation model, and trains the facial animation generation model with an independent feature of each of the two or more training input data by using a second network function to cause the facial animation generation model to generate the facial animation according to the input data.

According to an exemplary embodiment of the present disclosure for implementing the foregoing object, the present disclosure provides a computer readable recording medium in which a data structure corresponding to a parameter of a neural network of which at least a part is updated during a training process is stored, in which an operation of the neural network is partially based on the parameter at least, and the training process includes: inputting two or more training input data to a facial animation generation model; training a common feature of the two or more training input data by using a first network function included in the facial animation generation model; and training the facial animation generation model with an independent feature of each of the two or more training input data by using a second network function to cause the facial animation generation model to generate the facial animation according to the input data.

According to the exemplary embodiment of the present disclosure, it is possible to provide the method of providing an animation based on input data.

DETAILED DESCRIPTION

Figure 1:
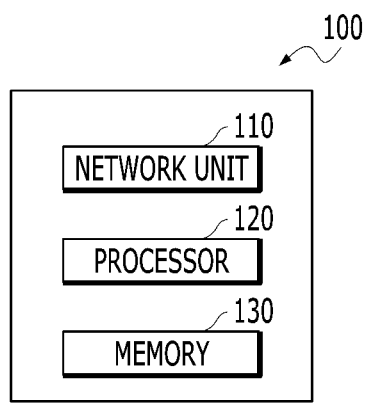
FIG. 1 is a block diagram of a computing device performing an operation for providing a method of generating an animation according to an exemplary embodiment of the present disclosure.

Hereinafter, various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread. One component may be localized within one computer. One component may be distributed between two or more computers. Further, the components may be executed by various computer readable medium having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented by hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present invention. Various modifications of the exemplary embodiments will be apparent to those skilled in the art. General principles defined herein may be applied to other exemplary embodiments without departing from the scope of the present disclosure. Therefore, the present invention is not limited to the exemplary embodiments presented herein. The present invention shall be interpreted within the broadest meaning range consistent to the principles and new characteristics presented herein.

In the exemplary embodiment of the present disclosure, a server may include a computing device having a predetermined form. The server is a digital device, and may be a digital device, such as a laptop computer, a notebook computer, a desktop computer, a web pad, and a mobile phone, which is equipped with a processor, includes a memory, and has a computation capability. The server may be a web server processing a service. The foregoing kind of server is merely an example, and the present disclosure is not limited thereto.

FIG. 1 is a block diagram of a computing device performing an operation for providing a method of generating an animation according to an exemplary embodiment of the present disclosure.

A computing device 100 for providing a method of generating a facial animation or a method of training a facial animation generation model according to the exemplary embodiment of the present disclosure may include a network unit 110, a processor 120, and a memory 130.

Hereinafter, a method of generating a facial animation by the processor 120 according to the exemplary embodiment of the present disclosure will be described.

Figure 2:
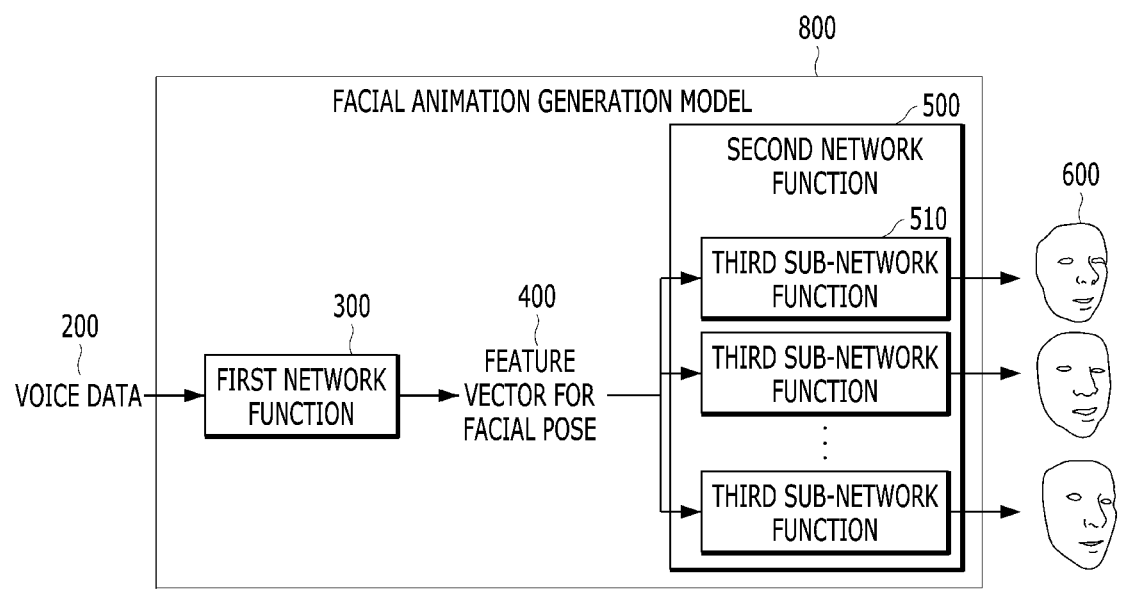
FIG. 2 is a diagram illustrating an example of a facial animation generation model according to an exemplary embodiment of the present disclosure.

FIG. 2 is a diagram illustrating an example of a facial animation generation model 800 according to the exemplary embodiment of the present disclosure.

The facial animation generation model 800 according to the exemplary embodiment of the present disclosure may generate a facial animation 600 corresponding to input data based on the input data. The facial animation generation model 800 according to the exemplary embodiment of the present disclosure may generate the facial animation 600 corresponding to each of two or more input data based on two or more input data.

The processor 120 may input two or more learning input data to the facial animation generation model 800.

The training input data may be the data corresponding to the input data which is input to the facial animation generation model 800 in order to train the facial animation generation model 800.

The processor 120 may receive the training input data through the network unit 110. The reception of the training input data according to the exemplary embodiment of the present disclosure may be the reception or the loading of the training input data stored in the memory 130. The reception of the training input data may be the reception or the loading of the training input data from another storage medium, another computing device, and a separate processing module within the same computing device based on a wired/wireless communication means.

The input data may include at least one of voice data 200 and meta data. The input data may be, for example, the voice data 200. The input data may also include, for example, all of the voice data 200 and meta data related to the voice data 200. The input data may also be, for example, text data that is the meta data. The particular description about the foregoing input data is merely an example, and the present disclosure is not limited thereto.

The voice data 200 may include data for a voice of a person. The voice data 200 may be data including sound information output to a game player during a game. For example, the voice data may include a digital file including information for reproducing sound information. The voice data may be stored in the form of a format, such as WAV, AIFF, AU, FLAC, TTA, MPE, AAC, and ATRAC, but is not limited thereto. The voice data 200 may be stored in a predetermined form of format including at least a part of sound information, in addition to the foregoing format. The sound information may be information about a sound spoken by a character of a game player and a Non-Player Character (NPC) or a sound spoken by a playable character played by another game player, other than one game player. For example, when a quest is provided to game players in a game, the game quest may be transmitted by using an animation. For example, the voice data 200 may be the data related to a voice of a character or an NPC in an animation effect of transmitting quest-related contents. For another example, the voice data 200 may be the data related to a voice spoken during a play of a game by a character or an NPC in the game. The voice data 200 may be the data obtained by recording contents related to a game quest with a voice. The voice data 200 may be pre-stored data of a game. The voice data 200 may be data pre-stored in a memory of a game server. Otherwise, the voice data 200 may be data about a voice pre-recorded or recorded in real time by a game player or another game player. The description of the foregoing voice data is merely an example, and the present disclosure is not limited thereto.

The meta data may be data related to a feature of a voice representation. The meta data may be text data, facial feature data, or emotional state data.

The text data may be the data in which contents included in a voice is written in text. The text data may be the data in which sound information output to a game player is textualized. For example, the text data may be a subtitle that is matched with sound information and is displayed to a game player together with an output of the sound information. For example, the text data may be subtitle data matched with a sound spoken by a character of a game player and an NPC. The text data may be data in which sound information output to a game player in a game is converted into text by using a Speech to Test (STT) algorithm. The particular description of the foregoing text data is merely an example, and the present disclosure is not limited thereto.

The facial feature data may be data representing a feature of a speaker. The facial feature data may be information about a feature of a face that is a basis of the generation of a facial animation. The facial feature data may be information about a feature of at least a partial configuration of a face that is a basis of the generation of a facial animation. For example, characters that appear in a game may be various races and species, and the facial feature data may be data according to a feature of a speaking game character. For example, Elf with big ears and good locking and Oak with a large face may have different locations, features, ratios, or the like of components configuring faces when speaking, and the facial feature data may include data for representing a discrimination according to a feature of a speaker to which a facial animation is applied. In the case where the facial animation generation model 800 processes the same input data, when the facial feature data related to the input data is different, a different output (that is, a facial animation having a different shape) may be generated.

The emotional state data may be data determined based on at least one of the voice data 200 and the text data. The emotional state data may be data related to an expression expressed in the facial animation 600. The emotional state data may be data representing a classification of the emotional state expressed in the facial animation 600. The emotional state data may be a vector with N dimensions for representing a classification of the emotional state. For example, the emotional state data may be a vector related to sadness, joy, delight, and the like. The emotional state data may be stored in the memory 130 based on a classification of the emotional state. Otherwise, the emotional state data may also be received from another computing device through the network unit 110. The particular description about the foregoing emotional state data is merely an example, and the present disclosure is not limited thereto.

The processor 120 may preprocess the training input data before inputting the training input data to the facial animation generation model 800. The processor 120 may preprocess input data before inputting the input data corresponding to the training input data to the facial animation generation model 800.

The processor 120 may preprocess the voice data 200 included in the input data before inputting the voice data 200 to the facial animation generation model 800. The preprocessing of the voice data 200 may mean a process of processing the voice data 200 in the form to be processed in one or more network functions included in the facial animation generation model 800. For example, the preprocessing of the voice data 200 may include an operation of deleting or converting at least a part of the voice data 200 or converting the voice data 200 to a format to be input to the facial animation generation model 800. The preprocessing of the voice data 200 may mean a partial correction of a waveform of the voice data 200. For example, the preprocessing of the voice data 200 may mean a separation of only voice data of a part in which a voice is present by using Voice Activity Detection (VAD) that is voice detection. Further, the preprocessing of the voice data may change an average of a signal to 0 and a standard deviation to 1 by removing noise of a signal, amplifying a frequency band in which a signal may be present, cutting a frequency band in which a signal may be present, increasing an amplitude of a signal to a maximum value and maximally using the number of bits allocated to a digital signal, standardizing the highest frequency or the lowest frequency based on a predetermined reference, or performing whitening. The particular description about the foregoing preprocessing is merely an example, and the present disclosure is not limited thereto. By preprocessing the voice data, performance of the facial animation generation model may be improved. By removing a noise part that is an unnecessary part in the voice data and transforming at least a part of the voice data, performance of the facial animation generation model may be improved.

The processor 120 may preprocess the meta data that is the input data before inputting the meta data to the facial animation generation model 800. The preprocessing of the meta data may mean a process of processing the meta data in the form to be processed in one or more network functions included in the facial animation generation model 800. The preprocessing of the text data may be a process of processing the text data in the vector form. For example, the processor 120 may vectorize the meaning of the text data by using a Word2Vec algorithm. The processor 120 may input the vectorized text data as an input of the facial animation generation model 800 in order to generate a facial animation by using the text data. The particular description about the foregoing preprocessing is merely an example, and the present disclosure is not limited thereto. When the meta data is used, it is possible to improve accuracy of the facial animation generation model. For example, when a computation is performed by using the meta data and the voice data as the input of the facial animation generation model, a look of a facial animation may be more natural compared to the case where only voice data is used. For example, even in the case of the words having the same pronunciation, it is possible to output different looks by using emotional data of the meta data, so that a look of the facial animation may be natural.

The processor 120 may train the facial animation generation model 800 by using a training data set. The processor 120 may train the facial animation generation model 800 by using two or more training data. The processor 120 may input two or more training input data to the facial animation generation model 800.

The training data set may be formed of training data matched with two or more facial feature data. Each of the two or more training data included in the training data set may be matched with the facial feature data. Each of the two or more training input data may be matched with the facial feature data. The training data may include the input data and a facial animation for the input data. For example, the training data may include voice data and a facial animation generated based on the voice data. The particular description about the foregoing training data is merely an example, and the present disclosure is not limited thereto.

The processor 120 may train the facial animation generation model 800 by using the two or more training data included in the training data set. The facial animation generation model 800 may learn a shared feature when generating vertex coordinates of the facial animations corresponding to the plurality of input data by using the plurality of associated training data. The facial animation generation model 800 may also learn an independent feature changed according to each of the plurality of facial feature data by using each of the plurality of associated training data. In the case where the facial animation generation model 800 according to the exemplary embodiment of the present disclosure is used, performance of learning a generalized characteristic of a language may be excellent. The particular description about the foregoing facial animation generation model is merely an example, and the present disclosure is not limited thereto.

Creating a high-quality facial animation in various conversational scenario included in a game may be difficult in terms of manpower and cost. In general, a game may include many game characters, and a facial animation of each character may have a unique feature. According to the exemplary embodiment of the present disclosure, according to the exemplary embodiment of the present invention, in order to create a natural facial animation for each game character, the processor 120 may perform multi-task learning on the facial animation generation model 800. The multi-task learning may mean learning a relation between various associated tasks for improving whole generalization performance compared to independently learning each task (that is, training data). The facial animation generation model 800 according to the exemplary embodiment of the present disclosure may be conceived from the characteristic that the plurality of associated tasks including voice data and facial animations associated with different characters shares a vertex mapping pattern of a plurality of common voice data-facial animation and a point that each of the plurality of tasks has a unique facial animation feature. The facial animation generation model 800 according to the exemplary embodiment of the present disclosure may have an excellent generalization capability for languages, such as Korean, Chinese, and Japanese, compared to an existing facial animation generation model.

The facial animation generation model 800 may include a first network function 300 and a second network function 500. The first network function 300 may perform dimensionality reduction of the input data. The second network function 500 may perform dimensionality expansion of the input data. The processor 120 may input the input data to the first network function 300 and perform the dimensionality reduction computation. The processor 120 may input a result output by computing the input data by using the first network function 300 as an input of the second network function 500. The processor 120 may perform the dimensionality expansion computation of the data input to the second network function 500. The processor 120 may generate a facial animation 600 based on the input data based on the dimensionality expansion computation of the data input of the second network function 500.

The processor 120 may train the facial animation generation model with a common feature of two or more training input data by using the first network function 300 included in the facial animation generation model 800. The first network function 300 may output a common voice feature 330 of the two or more training input data by computing the two or more training input data, and output a feature vector 400 for a common facial pose corresponding to the input training input data. The first network function 300 may include two or more dimensionality reduction layers. The first network function 300 may include two or more convolutional layers. The feature vector 400 for the facial pose may be a feature vector for describing a facial pose (or facial appearance) based on the input data. The feature vector 400 for the facial pose may be a feature vector for generating a facial animation based on the input data. For example, the feature vector 400 for the facial pose may be determined based on the number of feature maps based on the input data, dimensionality of a time axis, and dimensionality of a phoneme that is the basis of the input data. The particular description about the foregoing feature vector of the facial pose is merely an example, and a method of computing the feature vector will be described below in detail with reference to FIGS. 3 and 4.

The processor 120 may train the facial animation generation model 800 with an independent feature of each of the two or more training input data by using the second network function 500 and make the facial animation generation model 800 generate the facial animation 600 according to the input data. The processor 120 may train the facial animation generation model 800 with an independent feature related with the facial feature data for the two or more training input data by using the second network function 500. The second network function 500 may be formed of one or more dimensionality expansion layers. The second network function 500 may generate the facial animation 600 by using the feature vector 400 for the facial pose. The second network function 500 may include two or more deconvolutional layers. The processor 120 may perform linear transformation on the feature vector 400 for the facial pose based on the second network function 500. The processor 120 may compute the feature vector 400 for the facial pose based on the second network function 500. The processor 120 may generate coordinates for generating the facial animation based on the computation of the second network function 500. The coordinates may be a reference point that is the basis of the facial animation. For example, the coordinates may be a vertex. The processor 120 may output a vertex location in the facial animation for generating the facial animation 600. The particular description about the foregoing second network function is merely an example, and the present disclosure is not limited thereto.

The second network function 500 may include two or more parallel third sub-network functions 510 associated with the facial feature data. The third sub-network function 510 may include one or more dimensionality expansion layers. For example, the third sub-network function 510 may include one or more deconvolutional layers. The third sub-network function 510 may generate coordinates for generating the facial animation based on the feature vector 400 for the facial pose and the face feature data. The two or more third sub-network function 510 may be associated with different facial feature data, respectively. For example, the first third sub-network function 510 may be the network function for outputting a facial animation for a monster character, and the second third sub-network function 510 disposed with the first third sub-network function 510 in parallel may be the network function for outputting a facial animation for an Elf character. That is, each of the two or more third sub-network functions 510 may perform a different operation on the feature vector 400 for the facial pose according to the facial feature data. The particular description about the foregoing third sub-network function is merely an example, and the present disclosure is not limited thereto.

The third sub-network function 510 may perform a computation based on a one hot vector that is a representation for the facial feature data associated with the third sub-network function. The one hot vector that is the representation for the facial feature data according to the exemplary embodiment of the present disclosure may represent information for discriminating one facial feature data from another facial feature data. For example, a different one hot vector may be matched to different facial feature data. For example, when the first third sub-network function 510 is associated with the facial feature data of the Elf character, the one hot vector that is the basis of the computation of the first third sub-network function 510 may be the vector representation having a value of 1 only for the Elf character, and having a value of 0 for the remaining characters. The first third sub-network function 510 may output a vertex that is the basis of the facial animation of the Elf character based on the feature vector 400 for the facial pose and the one hot vector for representing the facial feature data of the Elf character. The particular description about the foregoing third sub-network function is merely an example, and the present disclosure is not limited thereto.

The third sub-network function 510 may determine locations of two or more vertexes included in the facial animation 600. The third sub-network function 510 may determine a location of a vertex for generating the facial animation 600 corresponding to the facial feature data associated with the third sub-network function 510. The processor 120 may generate two or more facial animations 600 based on the vertex locations computed by using two or more third sub-network functions 510 included in the second network function 500. The two or more facial animations 600 may be matched with the different facial feature data, respectively. For example, the facial animation 600 may be matched with different characters or face configurations of the character. The vertex may be the point that is the basis of the facial animation. The processor 120 may determine a shadow, a contour, and the like of the face based on the location of the vertex. The processor 120 may generate a facial animation by connecting two or more vertexes. The processor 120 may generate the facial animation based on the locations of the two or more vertexes included in the face. For example, the vertex may be the coordinates of the point determined for generating a 3D animation. The particular description about the foregoing vertex is merely an example, and the present disclosure is not limited thereto.

An initial training weight of the third sub-network function 510 according to the exemplary embodiment of the present disclosure will be described.

An initial training weight of at least a part of layers included in the third sub-network function 510 may be determined based on principal component analysis data of training data included in a training data subset associated with the facial feature data associated with the third sub-network function 510.

The training data set may include two or more training data subsets. Each of the two or more training data subsets may be matched with the facial feature data. For example, the training data set may include a first training data subset matched with the facial feature data of the Elf character and a second training data subset matched with the facial feature data of the Oak character. Two or more training data included in the training data subset may be the training data related to the facial feature data matched with the training data subset. For example, the two or more training data included in the first training data subset may be associated with the facial feature data of the Elf character.

Principal component analysis data of the training data included in the training data subset may be the data representing features of the training data. The Principal Component Analysis (PCA) may be one kind of the dimensionality reduction algorithm. The processor 120 may reduce the dimensionality of the high-dimensional training data by using the PCA and determine principal component analysis data that is a sample of the training data. The PCA data may be abstract data for representing the training data included in the training data subset. The processor 120 may determine an initial weight for training the third sub-network function 510 by using the PCA data. The processor 120 may determine the initial weight of the third sub-network function 510 as a value for outputting a value corresponding to the PCA data. In the case where the facial animation generation model 800 is trained by determining the initial weight of the third sub-network function 510 based on the PCA data, a learning speed may be high and learning efficiency may be higher compared to the case where the facial animation generation model 800 is trained by randomly determining the initial weight.

A method of training the facial animation generation model 800 according to the exemplary embodiment of the present disclosure will be described.

The processor 120 may train the facial animation generation model 800 including the first network function 300 and the second network function 500 based on the training data set including the training data associated with each of the two or more facial feature data. The first network function 300 may be the network function for training a common feature between the training data. The first network function 300 may be the network function for outputting the feature vector 400 for the facial pose based on the input data. The first network function 300 may be the network function for outputting the feature vector 400 for the common facial pose between the input data. The second network function 500 may be the network function for training the independent feature of each of the training data. The second network function 500 may be the network function for generating the facial animation 600 based on the feature vector 400 for the facial pose. The second network function 500 may be the network function for generating the facial animation 600 corresponding to the facial feature data based on the facial feature data.

The processor 120 may be trained based on an error of the output obtained by computing the training input data as an input of the facial animation generation model 800 and the facial animation that is the label included in the training data.

The error may be determined based on at least one of a difference between the output and the locations of the two or more vertexes of each facial animation that is the label included in the training data and whether a speed of a movement included in the output facial animation is appropriate. The facial animation may be generated based on two or more vertexes. The error may be determined based on the output and a difference between the locations of the two or more vertexes included in the facial animation of each label. The error may be determined based on the number of the portions in which the locations of the vertexes are different, a distance based on the location of the vertex, and the like. The error may be determined based on a time change of the output facial animation and the location of the vertex according to the time change. The error may be determined based on a difference between a location of a first vertex included in the facial animation at a first time and a location of a second vertex included in the facial animation at a second time. A threshold value of a distance between the first vertex and the second vertex may be determined based on a speed at which the facial muscles of a person move. When a difference in a distance between the location of the first vertex at the first time and the location of the second vertex at the second time is equal to or larger than the predetermined value (that is, when the facial muscles of a person move faster than an appropriate speed at which they can move), it may be determined that the error exists between the output of the facial animation generation model 800 and the label. The particular description about the foregoing error based on the training of the facial animation generation model is merely an example, and the present disclosure is not limited thereto.

The error calculated based on the output of the facial animation generation model 800 and the label may be back-propagated in a direction from an output layer to an input layer that is a reverse direction in the facial animation generation model 800. In the training according to the exemplary embodiment of the present disclosure, a connection weight of each of the layers of each layer may be updated according to back-propagation in which the error is back-propagated in the direction from the output layer to the input layer. A change amount of the updated connection weight of each node may be determined according to a learning rate. The learning rate may mean the update rate of the weight. When the learning rate is low, the update rate of the weight may be low, and when the learning rate is high, the update rate of the weight may be high.

The facial animation generation model 800 may be the trained model in which a learning rate of one portion of the facial animation generation model 800 is set to be different from a learning rate of the other portion. The facial animation generation model 800 may be the trained model in which a learning rate of one portion of the facial animation generation model 800 is set to be different from a learning rate of the other portion during a predetermined epoch. The facial animation generation model 800 may be the trained model in which the update rate of the weights for the remaining layers except for the first network function 300 and at least a part of the layers of the second network function 500 is set to be different from the update rate of the weight for at least a part of the layers of the second network function during a predetermined epoch. The facial animation generation model 800 may be the trained model in which it is set not to perform the updating of the weight for an output layer that is the last layer of the second network function 500 (that is, the update rate of the weight is 0) and perform the updating of the weight for the remaining layers except for the output layer of the second network function 500 and the layers of the first network function 300 during a predetermined epoch. For example, the predetermined epoch may mean the first 10 epoch after the start of the training. The particular description about the foregoing learning rate is merely an example, and the present disclosure is not limited thereto.

The training epoch may be an operation of inputting the training input data for all of the training data included in the training data set to each of one or more input nodes included in the input layer of the one or more network functions of the facial animation generation model 800, drawing an error by comparing the facial animation (that is, the correct answer) labelled to the training input data and the facial animation (that is, the output) output from the facial animation generation model 800, and propagating the drawn error from the output layer of the one or more network functions of the facial animation generation model to the input layer via one or more hidden layers to update the weight set in each link. That is, the case of performing the computation by using the facial animation generation model 800 for the all of the training data included in the training data set and the updating of the weight for the facial animation generation model 800 may be 1 epoch.

In the case of the backpropagation based on the error between the output obtained by performing the computation by using the two or more training input data as the input of the facial animation generation model and the two or more training facial animations, the facial animation generation model may be trained by the operation of excluding at least a part of the layers of the second network function 500 and updating the weights only for the remaining layers except for at least a part of the layers of the second network function and the first network function during a predetermined epoch. When the processor 120 performs the backpropagation based on the error, the processor 120 may train the facial animation generation model 800 by updating the weights only for the remaining layers except for the output layer that is the last layer of the second network function 500 and the layers of the first network function 300. The particular description about the foregoing method of training the facial animation generation model is merely an example, and the present disclosure is not limited thereto.

According to another exemplary embodiment of the present disclosure, when the processor 120 updates the weight for the second network function 500, the processor 120 may update the weight only for the third sub-network function 510 related to the training data and may not update the weights for the remaining third sub-network functions 510. For example, when the training data includes the voice data for the Elf character and the facial animation for the Elf character, the processor 120 may update the weight only for the third sub-network function 510 associated with the facial feature data of the Elf character when updating the weight according to the training of the corresponding training data and may not update the weights for the remaining third sub-network functions 510. The particular description about the foregoing method of training the facial animation generation model is merely an example, and the present disclosure is not limited thereto.

When the animation is generated by using the input data as the input of the facial animation generation model, it is possible to save time and cost for generating the facial animation. In the case of the game industry, voice actors generally record voices based on a game story and designers generate the animations that match the voices one by one. The work time and cost of the designers generating the animation may be considerable. The volume of game stories used in the game industry is huge, so that the volume of animations required to be generated according to the huge volume of game stories is also considerably large. According to the exemplary embodiment of the present disclosure, in the case where the computation is performed by using voice data recorded by a voice actor or text data, such as subtitles, related to the game story as the input of the facial animation generation model and the facial animation is output, there is an effect that it is possible to reduce the time and cost of numerous facial animation generating operations used in the game.

Figure 3:
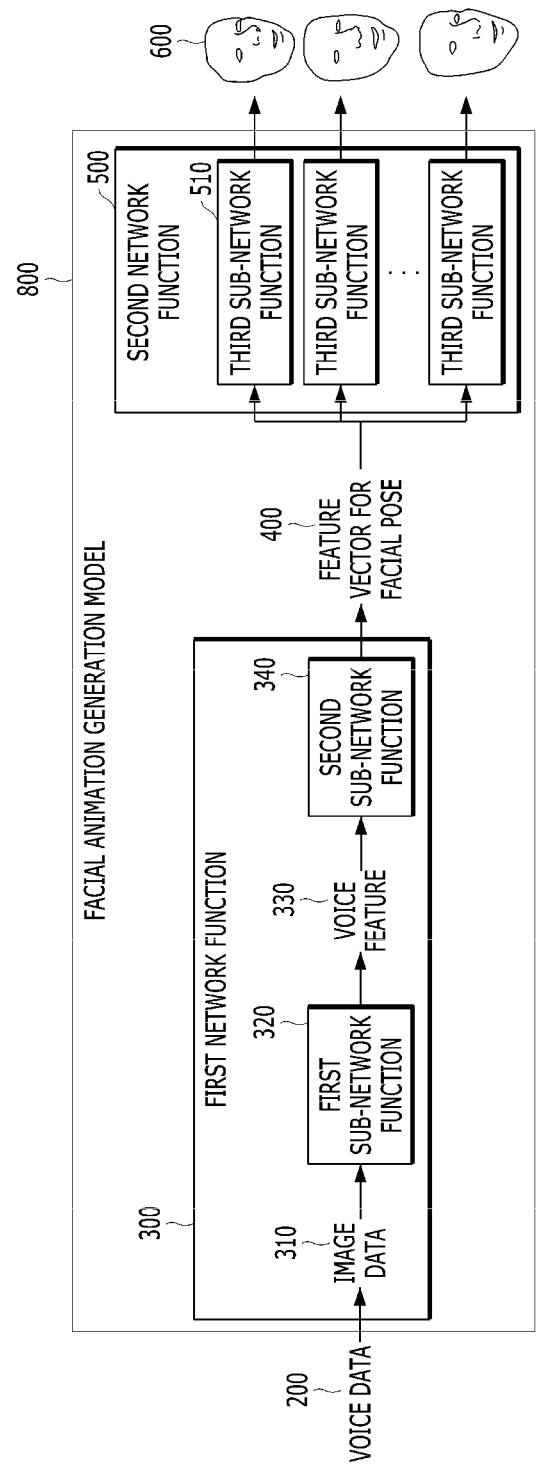
FIG. 3 is a diagram illustrating an example of a facial animation generation model according to an exemplary embodiment of the present disclosure.

Hereinafter, the first network function according to the exemplary embodiment of the present disclosure will be described with reference to FIG. 3. FIG. 3 is a diagram illustrating an example of the facial animation generation model according to the exemplary embodiment of the present disclosure.

The processor 120 may compute and output a feature vector 400 for a facial pose based on input data by using the first network function 300. The processor 120 may compute the input data by using the first network function 300 including two or more convolutional layers and output the feature vector 400 for the facial pose for generating the facial animation 600. The processor 120 may compute two or more training input data by using the first network function 300 and output the feature vector 400 for the facial pose corresponding to a common feature for generating two or more facial animations 600. The two or more layers included in the first network function 300 according to an exemplary embodiment of the present disclosure may output an output based on the input. For example, the output may be represented with (the number of feature maps)×(dimensionality of the time axis)×(dimensionality of a formant axis). The particular description about the foregoing output is merely an example, and the present disclosure is not limited thereto.

The processor 120 may convert voice data 200 that is the input data to image data 310 based on the voice data. The processor 120 may convert the preprocessed voice data 200 to the image data 310 based on the voice data. In order to compute the voice data 200 based on the convolutional layer, the processor 120 may convert the preprocessed voice data 200 to the image data 310 based on the voice data. The image data 310 may be the data in which sound information based on the voice data 200 is represented in the form of an image. The image data 310 may be processed by the first network function 300 including the convolutional layer. The function of converting the voice data 200 to the image data 310 based on the voice data may be a predetermined image data converting function. The predetermined image data converting function may also be updated based on an error during the training of the facial animation generation model 800, or may also fixedly perform the conversion to the image data 310 without the update during the training of the facial animation generation model. The predetermined image data converting function may convert the voice data to the image data 310 based on a frequency of the voice data 200. The particular description about the foregoing image data converting function is merely an example, and the present disclosure is not limited thereto.

The facial animation generation model 800 according to the exemplary embodiment of the present disclosure may perform linear predictive coding before the voice data 200 that is the input data is input to the facial animation generation model. The facial animation generation model 800 may also convert the 256 ms voice data 200 of a sampling rate of 16 k with a 64×32 Linear Predictive Coding (LPC) function. The descriptions of the facial animation generation model and the linear predictive coding described in the exemplary embodiment of the present disclosure are discussed in more particular in the thesis "Li Deng and Douglas O'Shaughnessy, 2003, "Speech Processing: A Dynamic and Optimization-Oriented Approach." CRC Press." of which the entirety is incorporated herein by reference.

The first network function 300 may include the first sub-network function 320 and the second sub-network function 340 formed of one or more dimensionality reduction layers.

The first sub-network function 320 may compute two or more training input data and output a common voice feature 330 of the two or more training input data. The processor 120 may compute two or more image data 310 based on the two or more training input data based on the first sub-network function 320 and output a common voice feature 330 of the training input data. The voice feature 330 may mean the feature based on which the input voice data 200 is discriminated from other voice data. The common voice feature 330 of the training input data may mean the commonly extracted feature between the training input data (that is, the training voice data). The voice feature 330 may mean the feature based on which sound information output to a game player during a game is discriminated from other sound information. The voice feature 330 may be the feature of the voice spoken by a character or an NPC in a game during a game play. The voice feature 330 may be the feature based on the voice data related to the facial animation. For example, the voice feature 330 may be the feature related to the facial animation about intonation of the voice, emphasis of the voice, a specific phoneme of the voice, a formant of the voice, and the like. The voice feature 330 may be the information computed based on the image data 310 that is obtained by converting the voice data. The particular description about the foregoing voice feature is merely an example, and the present disclosure is not limited thereto.

The second sub-network function 340 may compute the common voice feature 330 and output a feature vector for a common facial pose corresponding to the two or more training input data. The processor 120 may compute the voice feature 330 based on the second sub-network function 340 and output the feature vector 400 for the facial pose. The processor 120 may compute the feature based on the voice data related to the animation based on the second sub-network function 340. For example, the processor 120 may output the feature vector 400 for the facial pose by computing the voice feature 330 including the feature about intonation of the voice, emphasis of the voice, a specific phoneme of the voice, and the like by using the second sub-network function 340. The second sub-network function 340 may be the network function for computing a speaking scheme for expressing a phoneme that is the voice feature 330.

Figure 4:
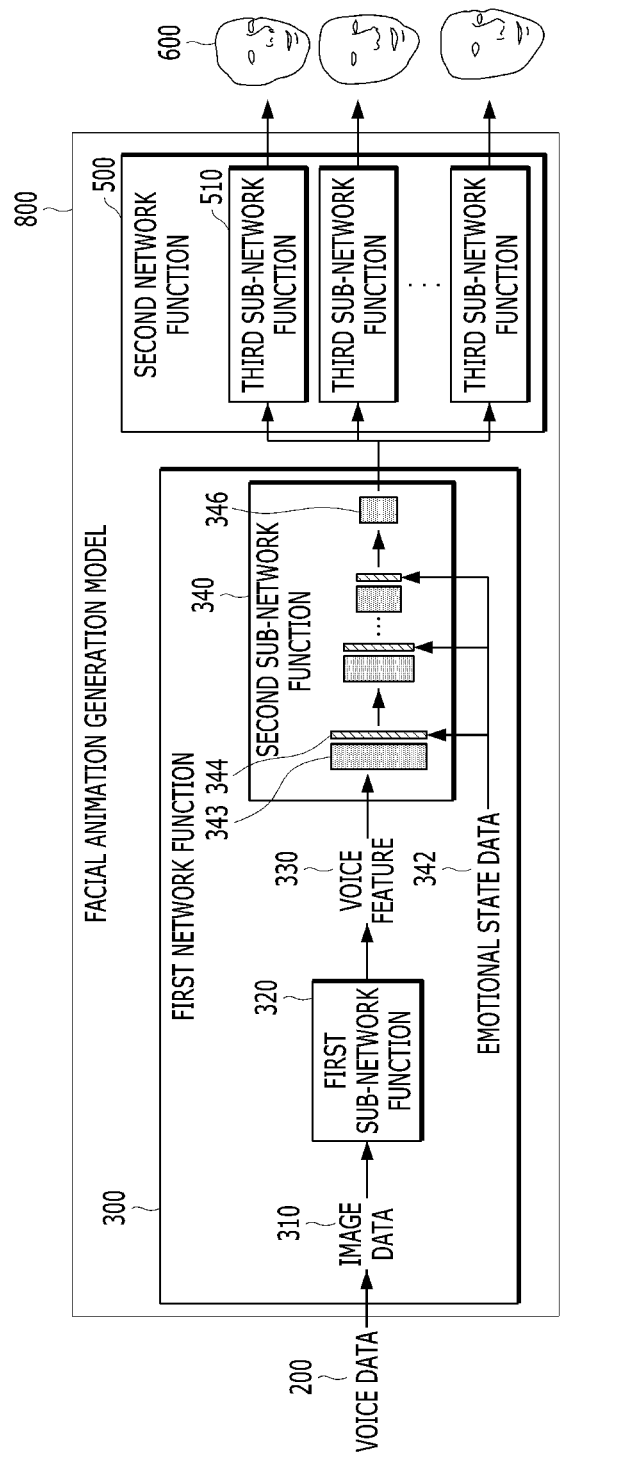
FIG. 4 is a diagram illustrating an example of a facial animation according to an exemplary embodiment of the present disclosure.

Hereinafter, the first network function according to the exemplary embodiment of the present disclosure will be described with reference to FIG. 4. FIG. 4 is a diagram illustrating an example of a facial animation according to the exemplary embodiment of the present disclosure.

The processor 120 may compute the voice feature 330 based on the second sub-network function 340 and output the feature vector 400 for the facial pose.

Even in the case of including the same voice feature, the facial animation may be differently expressed according to the meta data. Even in the case of including the same voice feature, the facial animation may be differently expressed according to the text data. For example, the facial animation may also be expressed in more detail by reflecting a punctuation mark, such as a comma or quotation marks, to the facial animation. Even in the case of including the same voice feature, the facial animation may be differently expressed according to the facial feature data. For example, in the case where the same voice data is expressed through the characters of different races, the different facial animations may be output. The facial animation may be differently expressed according to an emotional state of a speaker. Even for the voice data generated by pronouncing the same word with the same note and emphasis, when the emotions are different, the facial animation may be differently expressed. Accordingly, in order to improve accuracy of the expression of the facial animation, the facial animation may be generated in consideration of the meta data related to the voice data.

The processor 120 may input the meta data matched to the input data to at least a part of the layers of the first network function 300 or the second network function 500. The processor 120 may input the meta data to the remaining layers, except for the last layer, of the first network function 300. The processor 120 may input the meta data related to the input data to at least a part of the layers of the second sub-network function 340. The processor 120 may input the meta data related to the input data to the remaining layers, except for the last layer 346, of the second sub-network function 340.

The meta data may be the data determined based on the input data. The meta data may be the data related to the expression expressed in the facial animation 600. For example, the meta data may be the data representing a classification for the emotional state or the facial feature expressed in the facial animation 600. The meta data may be the N-dimensional vector for representing a classification for the emotional state or the facial feature. The meta data may be the vector having the form that may be computed in each of the two or more concatenation layers included in the second sub-network functions 340. For example, the emotional state data 342 included in the meta data may be the vector related to sadness, joy, delight, and the like, and the facial feature data included in the meta data may be the vector related to Elf, a person, a goblin, and the like. The meta data may be stored in the memory 130 based on the classification about the emotional state or the facial feature. Otherwise, the meta data may also be received from another computing device. For example, in the case where the meta data is the N-dimensional vector, the outputs of the first layer 343 and the second layer 344 may be (256+×32×1 and the outputs of the third layer and the fourth layer may be (256+×16×1. The particular description about the foregoing meta data and layer is merely an example, and the present disclosure is not limited thereto.

The meta data according to the exemplary embodiment of the present disclosure may be the data manually labelled to the input data. The processor 120 may input the meta data manually labelled based on the input data as the input of the second sub-network function 340 included in the facial animation generation model 800. For example, a person may directly and manually perform labeling the meta data on each of the two or more input data and input the meta data as the input of the facial animation generation model 800. For example, the N-dimensional vector that is the joy emotional state data or the facial feature data about the Elf character stored in the memory 130 based on the manual labelling may be input as the input of the facial animation generation model 800. The particular description about the foregoing meta data is merely an example, and the present disclosure is not limited thereto.

The meta data according to the exemplary embodiment of the present disclosure may be trained according to the training of the facial animation generation model 800. The initial vector for the meta data may be determined with a random value and a value of the meta data may be updated and determined based on the output value of the facial animation and the label of the facial animation. For example, the initial vector for the meta data may be randomly determined based on the Gaussian distribution. The particular contents about the training of the meta data will be described in detail below.

The processor 120 may compute the voice feature 330 based on the second sub-network function 340 and output a sub feature vector for the facial pose. The processor 120 may correct the sub feature vector for the facial pose based on the meta data and output the feature vector 400 about the facial pose.

The processor 120 may compute the voice feature 330 and the meta data by using the second sub-network function 340 including two or more convolutional layers and concatenation layers. The convolutional layer and the concatenation layer may exist in pairs and may be located in the second sub-network function 340 in the order of the convolutional layer, the concatenation layer, the convolutional layer, and the concatenation layer. The meta data is not input to the last convolutional layer 346 of the second sub-network function 340, so that the concatenation layer matched with the last convolutional layer 346 may not exist. Each of the two or more concatenation layers may output the sub feature vector for the facial pose based on the output of the just previous convolutional layer and the metal data. The processor 120 may input the sub feature vector for the facial pose output from each of the two or more concatenation layers as the input to the convolutional layer located next to the concatenation layer.

The processor 120 may output a sub feature vector for a first facial pose based on the voice feature 330 by inputting the voice feature 330 as the input of the first layer 343 included in the second sub-network function 340. The first layer 343 may be the convolutional layer.

The processor 120 may output a sub feature vector for a second facial pose by inputting the sub feature vector for the first facial pose and the meta data as the input of the second layer 344 included in the second sub-network function 340. The second layer 344 may be a concatenation layer. The second layer 344 may perform the computation based on the sub feature vector for the first facial pose and the meta data. The second layer 344 may correct the sub feature vector for the first facial pose based on the meta data. The second layer 344 may output the sub feature vector for the second facial pose based on the sub feature vector for the first facial pose and the meta data.

The processor 120 may output a sub feature vector for a third facial pose by inputting the sub feature vector for the second facial pose as the input of the third layer. The third layer may be the layer closer to the output layer than the first layer 343. The third layer may be the convolutional layer. The third layer may output the sub feature vector having a smaller size than that of the first layer.

The processor 120 may output a sub feature vector for a fourth facial pose by inputting the sub feature vector for the third facial pose and the meta data as the input of the fourth layer included in the second sub-network function 340. The fourth layer may be a concatenation layer. The fourth layer may output the sub feature vector having a smaller size than that of the second layer.

For example, in the case where the outputs of the first layer 343 and the second layer 344 included in the second sub-network function 340 may be (256+N)×32×1, the outputs of the third layer and the fourth layer may be (256+N)×16×1. The particular description about the foregoing size of the output of the layer is merely an example, and the present disclosure is not limited thereto.

When the facial animation is generated by using the meta data, the expression of the facial animation become more natural, and facial expressions that are difficult to be expressed by voice may also be reflected to the facial animation.

When the facial animation generation model according to the exemplary embodiment of the present disclosure is used, general stability and generalization capability of the facial animation output based on all of the languages may be improved.

The network unit 110 may transceive the voice data, the meta data, and the like according to the exemplary embodiment of the present disclosure with another computing device, a server, and the like. Further, the network unit 110 may enable the plurality of computing devices to communicate with each other so that the training of the network function may be distributed and performed in each of the plurality of computing devices. The network unit 110 may enable the plurality of computing devices to communicate with each other so that the computation for outputting the facial animation by using the network function may be distributed and processed.

The network unit 110 according to the exemplary embodiment of the present disclosure may use various wired communication systems, such as a Public Switched Telephone Network (PSTN), an x Digital Subscriber Line (xDSL), a Rate Adaptive DSL (RADSL), a Multi rate DSL (MDSL), a Very High Speed DSL (VDSL), a Universal Asymmetric DSL (UADSL), a High Bit rate DSL (HDSL), and a Local Area Network (LAN). Further, the network unit 110 and a network unit 2100 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The technologies described in the present specification may also be used in other networks, as well as the foregoing networks.

The processor 120 may be formed of one or more cores, and may include a processor, such as a Central Processing Unit (CPU), a General Purpose Graphics Processing Unit (GPGPU), and a Tensor Processing Unit (TPU) of the computing device, for providing the facial animation generation model. The processor 120 may read a computer program stored in the memory 130 and provide the facial animation generation model according to the exemplary embodiment of the present disclosure. The processor 120 according to the exemplary embodiment of the present disclosure may perform the calculation for generating the facial animation based on the voice data. According to the exemplary embodiment of the present disclosure, the processor 120 may perform the calculation for training the facial animation generation model.

According to the exemplary embodiment of the present disclosure, the processor 120 may perform the computation for training a neural network. The processor 110 may perform a calculation, such as processing of input data for learning in deep learning (DN), extraction of a feature from input data, an error calculation, update of a weight of the neural network by using backpropagation, for learning of the neural network. At least one of the CPU, GPGPU, and the TPU of the processor 110 may process learning of a network function. For example, the CPU and the GPGPU may provide the training of the network function and the computation for generating the facial animation by using the network function. Further, in the exemplary embodiment of the present disclosure, it is possible to provide the training of the network function and the computation for generating the facial animation by using the network function by using the processors of the plurality of computing devices together. Further, the computer program executed in the computing device according to the exemplary embodiment of the present disclosure may be a CPU, GPGPU, or TPU executable program.

According to the exemplary embodiment of the present disclosure, the memory 130 may store a predetermined form of information generated or determined by the processor 120 and a predetermined form of information received by the network unit 110.

According to the exemplary embodiment of the present disclosure, the memory 130 may include at least one type of storage medium among a flash memory type, a hard disk type, a multimedia card micro type, and the card type of memory (for example, an SD or XD memory), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, and an optical disk. The computing device 100 may also be operated in association with a web storage which performs a storage function of the memory 130 on the Internet. The description of the foregoing memory is merely an example, and the present disclosure is not limited thereto.

The data structure may store data corresponding to a content processing algorithm according to the exemplary embodiment of the present disclosure.

According to the exemplary embodiment of the present disclosure, a computer readable medium storing a data structure is disclosed.

The data structure may mean organization, management, and storage of data that enables efficient access and correction of the data. The data structure may mean organization of the data for solving a specific problem (for example, data search, data storage, and data correction in the shortest time). The data structure may also be defined as a physical or logical relation between data elements designed so as to support a specific data processing function. The logical relation between the data elements may include a connection relation between the data elements considered by the user. The physical relation between the data elements may include an actual relation between the data elements physically stored in the computer readable storage medium (for example, a hard disk). The data structure may particularly include a set of data, a relation between data, and a function or a command applicable to data. The computing device may perform the computation by minimally using the resources of the computing device through the effectively designed data structure. Particularly, the computing device may improve efficiency of computation, reading, insertion, deletion, comparison, exchange, and search through the effectively designed data structure.

The data structure may be divided into a linear data structure and a nonlinear data structure according to the form of the data structure. The linear data structure may be a structure in which only one data is connected after one data. The linear data structure may include a list, a stack, a queue, and a deque. The list may mean a series of data sets that are internally ordered. The list may include a linked list. The linked list may be a data structure in which each data is connected in a line with a pointer. The pointer in the linked list may include link information with next or previous data. The linked list may be expressed as a single linked list, a dual-linked list, a circular linked list according to the form. The stack may be a data listing structure limitedly accessible to data. The stack may be a linear data structure that may process (for example, insert or delete) data only at one end of the data structure. The data stored in the stack may be a data structure (Last in First Out (LIFO)), in which the later the data is stored, the faster the data comes out. The queue is a data listing structure limitedly accessible to data, and may be a data structure (First in First Out (FIFO)), in which the later the data is stored, the later the data comes out, unlike the stack. The deque may be a data structure that may process data at both ends of the data structure.

The nonlinear data structure may be the structure in which the plurality of data is connected after one data. The nonlinear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a computation model, a nerve network, a network function, and a neural network may be used as the same meaning (hereinafter, unified and described as the neural network). The data structure may include a neural network. The data structure including the neural network may be stored in a computer readable medium. The data structure including the neural network may also include data input to the neural network, a weight of the neural network, a hyper parameter of the neural network, data obtained from the neural network, an active function associated with each node or layer of the neural network, and a loss function for training the neural network. The data structure including the neural network may include predetermined constituent elements among the disclosed configurations. That is, the data structure including the neural network may be formed of the entirety or a predetermined combination of data input to the neural network, a weight of the neural network, a hyper parameter of the neural network, data obtained from the neural network, an active function associated with each node or layer of the neural network, a loss function for training the neural network, and the like. In addition to the foregoing configurations, the data structure including the neural network may include other predetermined information determining a characteristic of the neural network. Further, the data structure may include any type of data used or generated in the computation process of the neural network, and is not limited to the foregoing matters. The computer readable medium may include a computer readable recording medium and/or a computer readable transmission medium. The neural network may be formed of a set of mutually connected calculation units which may be generally referred to as nodes. The nodes may also be referred to as neurons. The neural network includes one or more nodes.

The data structure may include data input to the neural network. The data structure including the data input to the neural network may be stored in the computer readable medium. The data input to the neural network may include training data input in the neural network training process and/or input data input to the neural network which is completely trained. The data input to the neural network may include preprocessed data and/or data to be preprocessed. The preprocessing may include a data processing process for inputting data to the neural network. Accordingly, the data structure may include the data to be processed and the data generated by the preprocessing. The foregoing data structure is merely an example, and the present disclosure is not limited thereto.

The data structure may include the data input to the neural network or the data output from the neural network. The data structure including the data input to the neural network or output from the neural network may be stored in the computer readable medium. The data structure stored in the computer readable medium may include data input in a deduction process or output data output as a result of the deduction of the neural network. Further, the data structure may include data processed by a specific data processing method, and may include data before and after the processing. Accordingly, the data structure may include the data to be processed and the data processed through the data processing method.

The data structure may include a weight of the neural network (in the present specification, the weight and the parameter may be used as the same meaning). Further, the data structure including the weight of the neural network may be stored in the compute readable medium. The neural network may include a plurality of weights. The weight may be variable, and in order for the neural network to perform a desired function, the weighted may be varied by a user or an algorithm. For example, when one or more input nodes are connected to one output node by links, respectively, the output node may determine an output node value based on the values input to the input nodes connected with the output node and a parameter set in the link corresponding to each of the input nodes. The foregoing data structure is merely an example, and the present disclosure is not limited thereto.

As a non-limited example, the weight may include a weight varied in a neural network training process and/or a weight when the neural network is completely trained. The weight varied in the neural network training process may include a weight at the start time of a training cycle and/or a weight varied during the training cycle. The weight when the neural network is completely trained may include a weight when the training cycle is completed. Accordingly, the data structure including the weight of the neural network may include a data structure including a weight varied in the neural network training process and/or a weight when the neural network is completely trained. Accordingly, it is determined that the weight and/or a combination of the respective weights are included in the data structure including the weight of the neural network. The foregoing data structure is merely an example, and the present disclosure is not limited thereto.

The data structure including the weight of the neural network may be stored in a computer readable storage medium (for example, a memory and a hard disk) after being subjected to a serialization process. The serialization may be the process of storing the data structure in the same or different computing device and converting the data structure into a form that may be reconstructed and used later. The computing device may serialize the data structure and transceive data through a network. The serialized data structure including the weight of the neural network may be reconstructed in the same computing device or the different computing device through deserialization. The data structure including the weight of the neural network is not limited to the serialization. Further, the data structure including the weight of the neural network may include a data structure (for example, B-Tree, Trie, m-way search tree, AVL tree, and Red-Black Tree in the nonlinear data structure) for improving efficiency of the computation while minimally using the resources of the computing device. The foregoing matter is merely an example, and the present disclosure is not limited thereto.

The data structure may include a hyper-parameter of the neural network. Further, the data structure including the hyper-parameter of the neural network may be stored in the computer readable medium. The hyper-parameter may be a variable varied by a user. The hyper-parameter may include, for example, a learning rate, a cost function, the number of times of the repetition of the training cycle, weight initialization (for example, setting of a range of a weight that is the target of the weight initialization), and the number of hidden units (for example, the number of hidden layers and the number of nodes of the hidden layer). The foregoing data structure is merely an example, and the present disclosure is not limited thereto.

Figure 5:
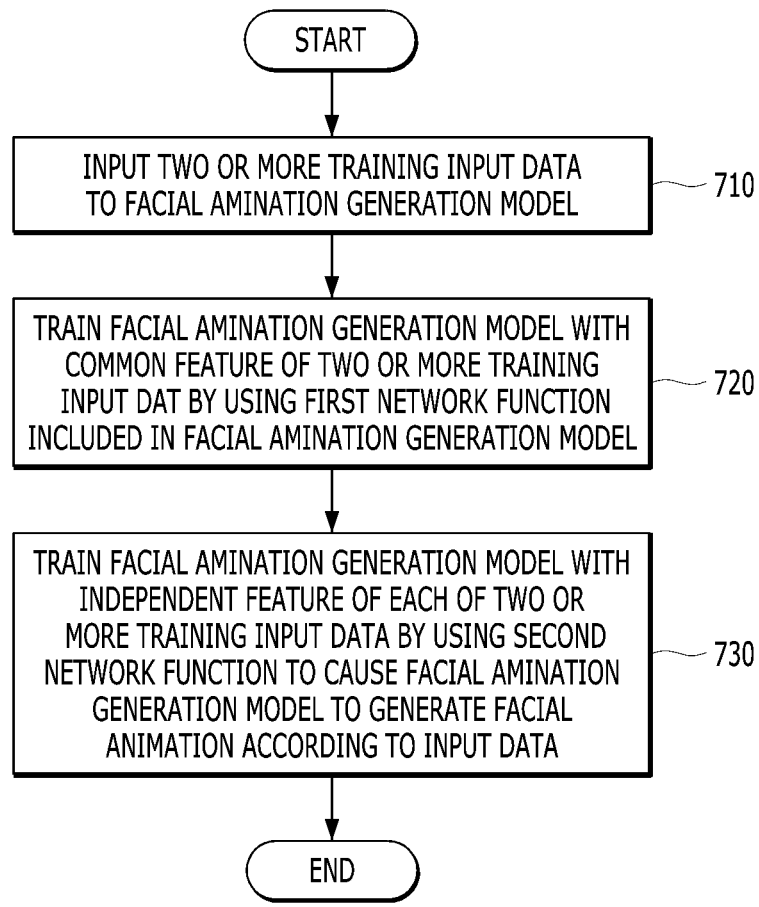
FIG. 5 is a flowchart of a method of generating a facial animation based on a facial animation generation model according to an exemplary embodiment of the present disclosure.

FIG. 5 is a flowchart of a method of generating a facial animation based on a facial animation creating model according to an exemplary embodiment of the present disclosure.

The computing device 100 may input two or more training input data to the facial animation generation model (710). Each of the two or more training input data may be matched with the facial feature data. The facial feature data may be information about a feature of a face that is a basis of the generation of a facial animation.

The computing device 100 may train the facial animation generation model with a common feature of the two or more training input data by using a first network function included in the facial animation generation model (720). The first network function may include a first sub-network function and a second sub-network function formed of one or more dimensionality reduction layers. The first sub-network function may compute two or more input data and output a common voice feature of the two or more input data. The second sub-network function may compute the common voice feature and output a feature vector about a common facial pose corresponding to the two or more input data. The voice feature may mean a feature based on which the input voice data is discriminated from another voice data. The common voice feature of the training input data may mean a feature commonly extracted between the training input data (that is, the training voice data). The feature vector for the facial pose may be the feature vector for explaining a pose of the face based on the input data (or an appearance of the face). The feature vector for the facial pose may be the feature vector for generating the facial animation based on the input data.

The computing device 100 may train the facial animation generation model with an independent feature of each of the two or more training input data by using the second network function to cause the facial animation generation model to generate the facial animation according to the input data (730). The second network function may be formed of one or more dimensionality expansion layers. The second network function may include two or more parallel third sub-network functions associated with the facial feature data. The third sub-network function may perform a computation based on a one hot vector that is a representation for the facial feature data associated with the third sub-network function and determine locations of the two or more vertexes included in the facial animation. The initial training weight of at least a part of the layers included in the third sub-network function may be determined based on principal component analysis data of the training data included in a training data subset associated with the facial feature data associated with the third sub-network function.

The computing device 100 may input emotional state data matched to the input data to at least a part of the layers of the first network function or the second network function. The computing device 100 may input the emotional state data to the remaining layers, except for the last layer, of the first network function.

The facial animation generation model may be trained by differently setting the update rate of the weights for the remaining layers, except for the first network function and at least a part of the layers of the second network function and the update rate of the weight for at least a part of the layers of the second network function during a predetermined epoch. In the case of backpropagation based on an error between an output obtained by performing the computation by using the two or more training input data as the input of the facial animation generation model and the two or more training facial animations, the facial animation generation model may be trained by an operation of excluding at least a part of the layers of the second network and updating the weights only for the remaining layers except for at least a part of the layers of the second network function and the first network function during a predetermined epoch.

Figure 6:
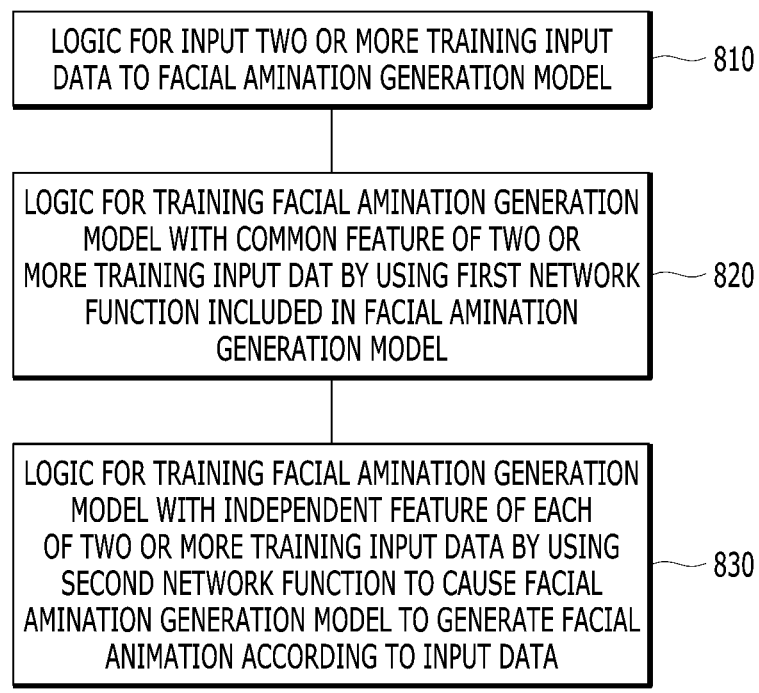
FIG. 6 is a block diagram illustrating logic for generating a facial animation based on a facial animation generation model according to an exemplary embodiment of the present disclosure.

FIG. 6 is a block diagram illustrating logic for generating a facial animation based on a facial animation generation model according to an exemplary embodiment of the present disclosure.

The method of generating a facial animation according to the exemplary embodiment of the present disclosure may be implemented by logic 810 for inputting two or more training input data to a facial animation generation model.

The method of generating a facial animation according to the exemplary embodiment of the present disclosure may be implemented by logic 820 for training a common feature of the two or more training input data by using a first network function included in the facial animation generation model.

The method of generating a facial animation according to the exemplary embodiment of the present disclosure may be implemented by logic 830 for training the facial animation generation model with an independent feature of each of the two or more training input data by using a second network function to cause the facial animation generation model to generate the facial animation according to the input data.

The method of generating a facial animation according to the exemplary embodiment of the present disclosure may be further implemented by logic for inputting emotional state data matched to the input data to at least a part of the layers of the first network function or the second network function.

The logic for inputting the emotional state data matched to the input data to at least a part of the layers of the first network function or the second network function of the method of generating the facial animation according to the exemplary embodiment of the present disclosure may be implemented by logic for inputting the emotional state data to the remaining layers, except for the last layer, of the first network function.

The method of generating the facial animation may also be implemented by a module, a circuit, or a means, as well as the logic.

Figure 7:
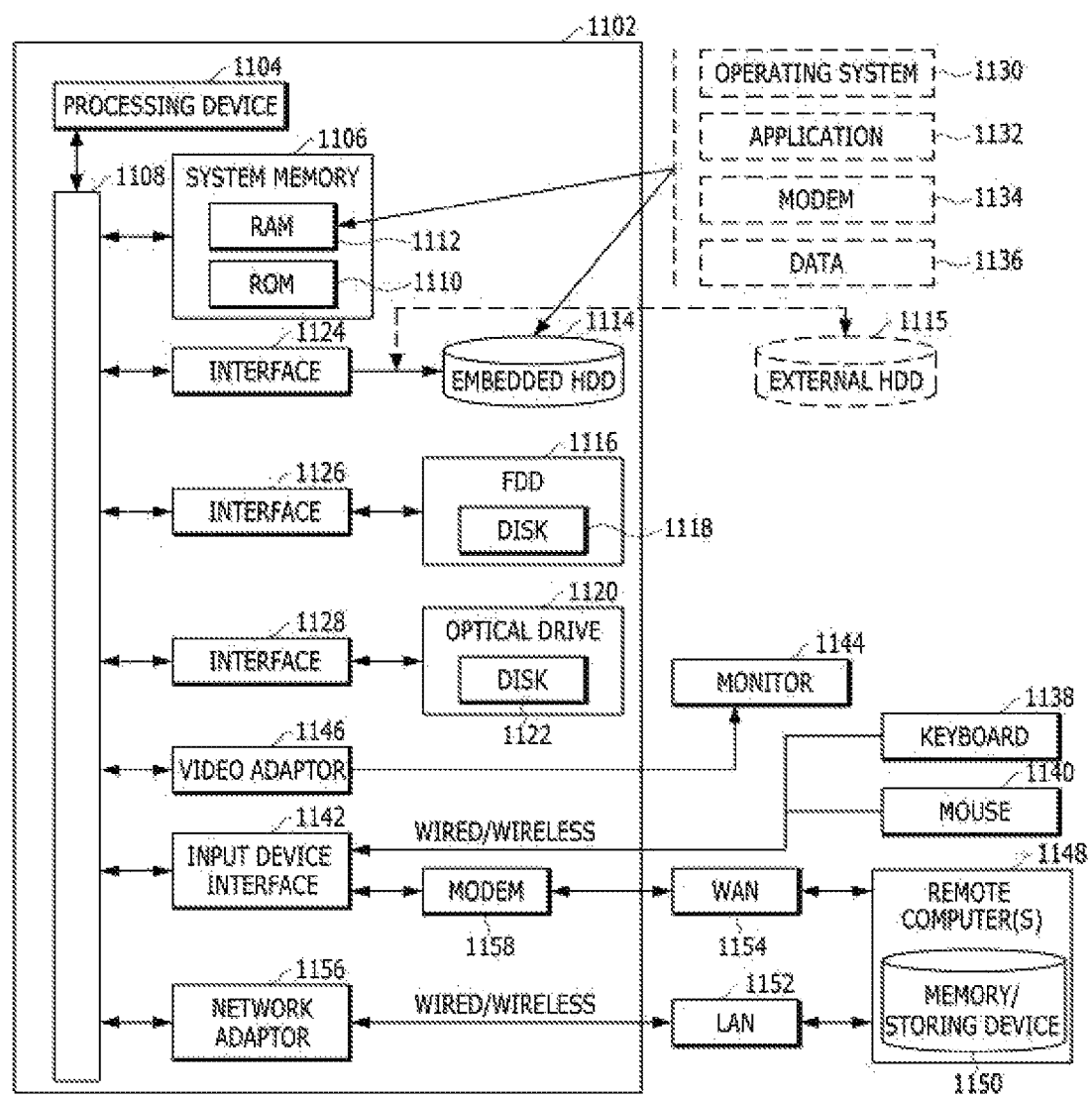
FIG. 7 is a block diagram of a computing device according to an exemplary embodiment of the present disclosure.

FIG. 7 is a block schematic diagram of a computing device according to an exemplary embodiment of the present disclosure.

FIG. 7 is a simple and general diagram for an example of a computing environment in which the exemplary embodiments of the present disclosure may be implemented.

The present disclosure has been generally described in relation to a computer executable command executable in one or more computers, but those skilled in the art will appreciate well that the present disclosure is combined with other program modules and/or be implemented by a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. A computer accessible medium may be a computer readable medium regardless of the kind of medium. The computer readable medium includes volatile and non-volatile media and transitory and non-transitory media, and portable and non-portable media. As a non-limited example, the computer readable medium may include a computer readable storage medium and a computer readable transport medium. The computer readable storage medium includes volatile and non-volatile media, transitory and non-non-transitory media, and portable and non-portable media constructed by a predetermined method or technology, which stores information, such as a computer readable command, a data structure, a program module, or other data. The computer storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may include a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 may also include a wireless access point installed therein for the communication with the wireless adapter 1156. When the computer 1102 is used in the WAN networking environment, the computer 1102 may include a modem 1158, or includes other means connected to a communication computing device in the WAN 1154 or setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electromagnetic fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program or a medium accessible from a predetermined computer-readable device. For example, the computer-readable medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable medium storing a computer program, wherein when the computer program is executed by one or more processors of a computing device, the computer program performs a method for generating facial animation, and the method includes:
   inputting two or more training input data into a facial animation generation model;
   training a common feature of the two or more training input data using a first network function included in the facial animation generation model; and
   training an independent feature of each of the two or more training input data using a second network function to cause the facial animation generation model to generate a facial animation according to input data;
   wherein the facial animation generation model is trained by differently setting an update rate of weights for the first network function and remaining layers except at least one layer of the second network function and an update rate of weights for the at least one layer of the second network function, during a predetermined epoch.

2. The non-transitory computer readable medium according to claim 1, wherein the first network function includes a first sub-network function and a second sub-network function composed of one or more dimension reduction layers, the first sub-network function computes two or more input data to output a common voice feature of the two or more input data, and the second sub-network function computes the common voice feature and outputs a feature vector about a common facial pose corresponding to the two or more input data.

3. The non-transitory computer readable medium according to claim 1, wherein each of the two or more training input data is matched with facial feature data, and the second network function is composed of one or more dimension expand layers and includes two or more parallel third sub-network functions associated with the facial feature data.

4. The non-transitory computer readable medium according to claim 3, wherein the third sub-network function performs a computation based on a one-hot vector, which is a representation of the facial feature data associated with the third sub-network function, and determines a location of two or more vertex included in facial animation.

5. The non-transitory computer readable medium according to claim 3, wherein initial weights of at least one layer included in the third sub-network function are determined based on principal component analysis data of training data included in the training data subset associated with the facial feature data associated with the third sub-network function.

6. The non-transitory computer readable medium according to claim 1, wherein the method further includes:
inputting emotional state data matched to the input data into at least one layer of the first network function or the second network function.

7. The non-transitory computer readable medium according to claim 6, wherein the inputting emotional state data matched to the input data into at least one layer of the first network function or the second network function includes:
inputting the emotional state data into at least one layer except a last layer of the first network function.

8. The non-transitory computer readable medium according to claim 1, wherein the facial animation generation model is trained by updating weights only for the first network function and the remaining layers except at least one layer of the second network function, except the at least one layer of the second network function, during a predetermined epoch, when a back propagation is performed based on an error of an output obtained by computing the two or more training input data as inputs of the face animation generation model and two or more training facial animations.

9. A method of generating facial animation comprising:
inputting two or more training input data into a facial animation generation model;
training a common feature of the two or more training input data using a first network function included in the facial animation generation model; and
training an independent feature of each of the two or more training input data using a second network function to cause the facial animation generation model to generate a facial animation according to input data;
wherein the facial animation generation model is trained by differently setting an update rate of weights for the first network function and remaining layers except at least one layer of the second network function and an update rate of weights for the at least one layer of the second network function, during a predetermined epoch.

10. A server for generating facial animation, comprising:
a processor including one or more cores; and
a memory;
wherein the processor is configured to
input two or more training input data into a facial animation generation model;
train a common feature of the two or more training input data using a first network function included in the facial animation generation model; and
train an independent feature of each of the two or more training input data using a second network function to cause the facial animation generation model to generate a facial animation according to input data;
wherein the facial animation generation model is trained by differently setting an update rate of weights for the first network function and remaining layers except at least one layer of the second network function and an update rate of weights for the at least one layer of the second network function, during a predetermined epoch.

11. A non-transitory computer readable medium storing data structure corresponding to weights of a neural network, at least one of the weights being updated during the training process, wherein the operation of the neural network is based at least in part parameters, the training process comprising:
inputting two or more training input data into a facial animation generation model;
training a common feature of the two or more training input data using a first network function included in the facial animation generation model; and
training an independent feature of each of the two or more training input data using a second network function to cause the facial animation generation model to generate a facial animation according to input data;
wherein the facial animation generation model is trained by differently setting an update rate of weights for the first network function and remaining layers except at least one layer of the second network function and an update rate of weights for the at least one layer of the second network function, during a predetermined epoch.

* * * * *